United States Patent
Liu et al.

(10) Patent No.: US 8,699,588 B2
(45) Date of Patent: Apr. 15, 2014

(54) SELF-ADAPTIVE FREQUENCY INTERPOLATOR FOR USE IN A MULTI-CARRIER RECEIVER

(75) Inventors: Peng Liu, Beijing (CN); Li Zou, Beijing (CN)

(73) Assignee: Thomson Licensing, Boulogne-Billancourt (FR)

( * ) Notice: Subject to any disclaimer, the term of this patent is extended or adjusted under 35 U.S.C. 154(b) by 609 days.

(21) Appl. No.: 12/733,455

(22) PCT Filed: Sep. 19, 2008

(86) PCT No.: PCT/IB2008/002448
§ 371 (c)(1),
(2), (4) Date: Mar. 2, 2010

(87) PCT Pub. No.: WO2009/040623
PCT Pub. Date: Apr. 2, 2009

(65) Prior Publication Data
US 2011/0129035 A1 Jun. 2, 2011

(30) Foreign Application Priority Data
Sep. 25, 2007 (EP) ..................................... 07301390

(51) Int. Cl.
*H04K 1/10* (2006.01)
*H04L 27/28* (2006.01)
(52) U.S. Cl.
USPC ......................................................... 375/260
(58) Field of Classification Search
USPC ................................................. 375/260, 267
See application file for complete search history.

(56) References Cited

U.S. PATENT DOCUMENTS 6,219,334 B1 4/2001 Sato et al.
6,320,627 B1 11/2001 Scott et al.
(Continued)

FOREIGN PATENT DOCUMENTS

EP 1221793 7/2002
EP 1313242 5/2003
(Continued)

OTHER PUBLICATIONS

Lai et al.: "One-Dimensional Interpolation Based Channel Estimation for Mobile DVB-H Reception," Circuits & Systems (ISCAS 2006), Proceedings of the 2006 IEEE Int'l. Symposium in Kos, Greece, May 21-24, 2006, Piscataway, NJ, USA, pp. 5207-5210.

(Continued)

*Primary Examiner* — Chieh M Fan
*Assistant Examiner* — Tanmay Shah
(74) *Attorney, Agent, or Firm* — Robert D. Shedd; Joseph J. Opalach (57) ABSTRACT

A Digital Video Broadcasting-Terrestrial/Handheld (DVB-T/H) receiver comprises a controller and a frequency interpolator for use in estimating channel state information (CSI) information of a received signal by frequency interpolation. The controller determines a multi-path delay ($T_{max}$) for the received signal and adjusts the bandwidth of the frequency interpolator as a function of the determined multi-path delay. For example, when the multi-path delay is small, the bandwidth of the frequency interpolator is adjusted to be smaller than the bandwidth of the frequency interpolator when the multi-path delay is large. In addition, the controller may also change the coefficients of the frequency interpolator such that different word lengths are used for the coefficients as a function of the determined multi-path delay.

11 Claims, 7 Drawing Sheets

(56) References Cited

U.S. PATENT DOCUMENTS

| | | |
|---|---|---|
| 2002/0143833 A1 | 10/2002 | Kawanishi et al. |
| 2004/0091058 A1* | 5/2004 | Tosato et al. ............... 375/261 |
| 2004/0218519 A1 | 11/2004 | Chiou et al. |
| 2007/0014378 A1* | 1/2007 | Parhi et al. ................. 375/267 |
| 2007/0177685 A1* | 8/2007 | Kawauchi ................... 375/260 |
| 2007/0274406 A1* | 11/2007 | Adachi ........................ 375/260 |
| 2008/0112470 A1* | 5/2008 | Cleveland et al. ........... 375/219 |
| 2008/0205455 A1 | 8/2008 | Okazaki |
| 2008/0292036 A1* | 11/2008 | Wilhelmsson et al. ...... 375/348 |

FOREIGN PATENT DOCUMENTS

| | | |
|---|---|---|
| GB | 22355164 | 4/2001 |
| JP | 10075226 | 3/1998 |
| JP | 10257013 | 9/1998 |
| JP | 2002064464 | 2/2002 |
| JP | 2002217861 | 8/2002 |
| JP | 2002290209 | 10/2002 |
| JP | 2005260331 | 9/2005 |
| JP | 2006313981 | 11/2006 |
| WO | WO2007023530 | 3/2007 |

OTHER PUBLICATIONS

International Search Report, dated Apr. 7, 2009.

* cited by examiner

FIG. 1

*Prior Art*

SELF-ADAPTIVE FREQUENCY INTERPOLATOR FOR USE IN A MULTI-CARRIER RECEIVER

This application is a National Stage Application and claims the benefit, under 35 U.S.C. §365 of International Application PCT/IB2008/002448 filed Sep. 19, 2008, which was published in accordance with PCT Article 21(2) on Apr. 2, 2009 in English, and which claims the benefit of European Patent Application No. 07301390.6 filed on Sep. 25, 2007.

BACKGROUND OF THE INVENTION

The present invention generally relates to communications systems and, more particularly, to wireless systems, e.g., terrestrial broadcast, cellular, Wireless-Fidelity (Wi-Fi), satellite, etc.

Digital Video Broadcasting-Terrestrial (DVB-T) (e.g., see ETSI EN 300 744 V1.4.1 (2001-01), *Digital Video Broadcasting (DVB); Framing structure, channel coding and modulation for digital terrestrial television*), is one of the four kinds of digital television (DTV) broadcasting standards in the world, and DVB-H is a standard for handheld applications based on DVB-T (also referred to herein as DVB-T/H). DVB-T uses Orthogonal Frequency Division Multiplexing (OFDM) technology, i.e., DVB-T uses a form of a multi-carrier transmission comprising many low symbol rate subcarriers that are orthogonal.

OFDM technology provides high data rate wireless communications. In an OFDM-based communication system, it is crucial for the receiver to determine channel state information for every subcarrier. Channel state information represents the degree of confidence in each subcarrier for reliably transmitting data.

Figure 1:
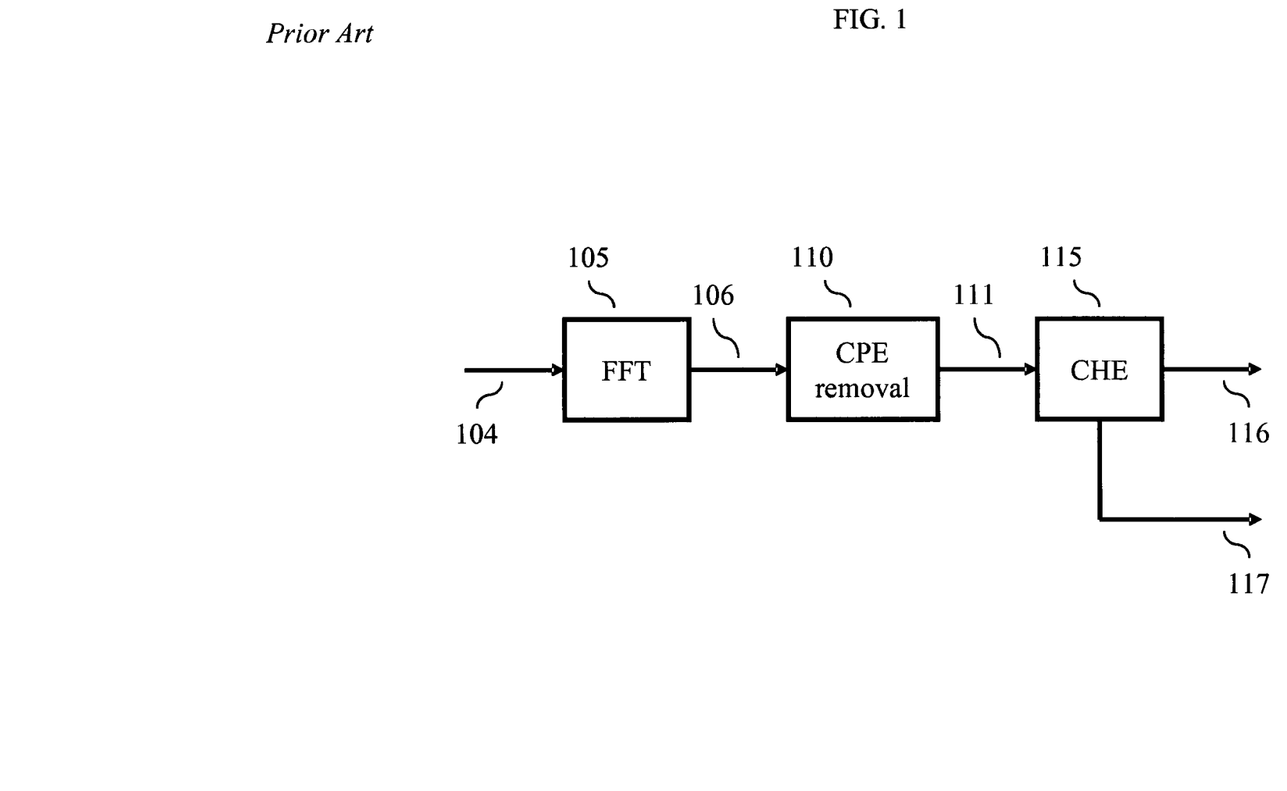
FIGS. 1 and 2 show estimation of channel state information as in the prior art.
Figure 2:
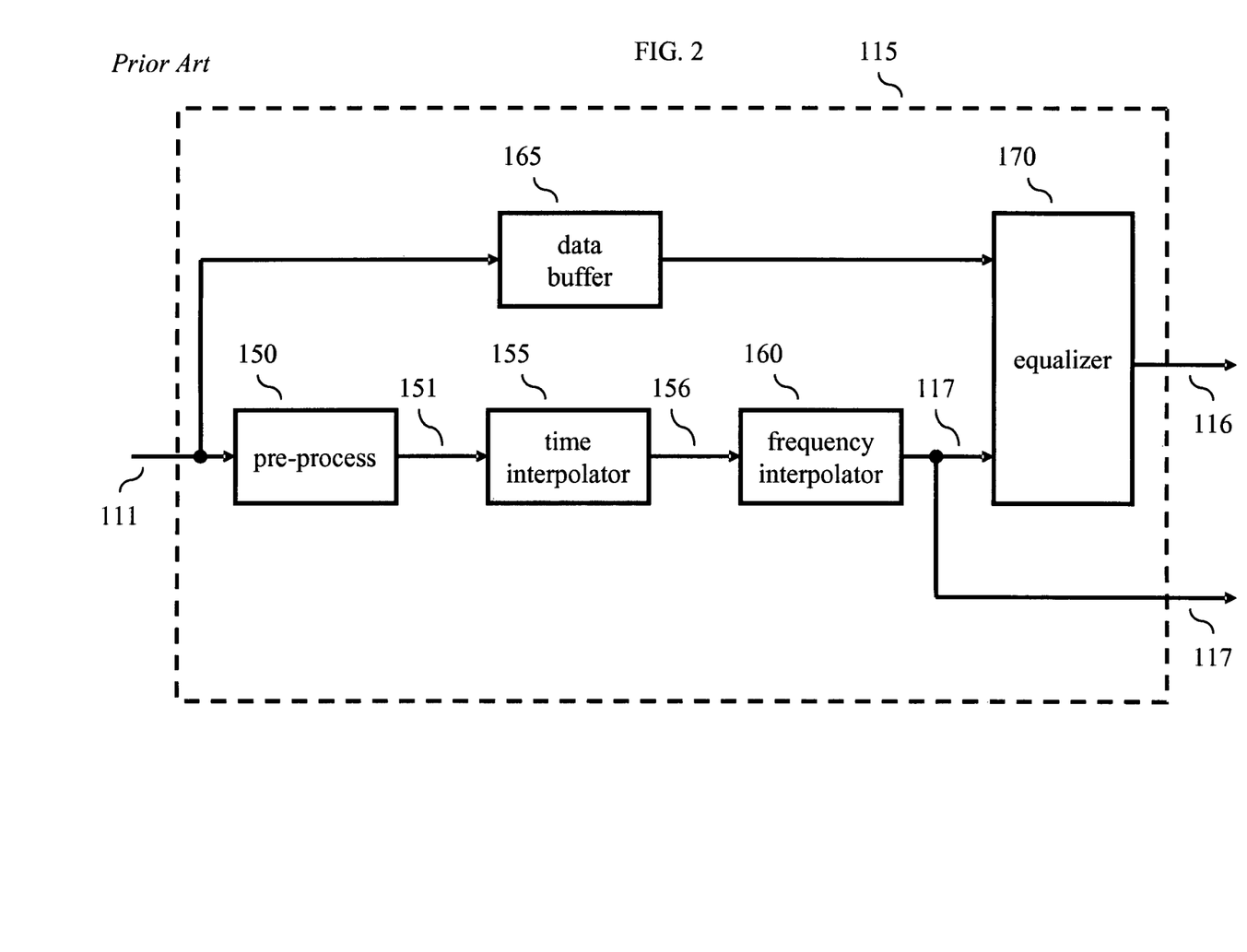

A conventional channel estimation arrangement is shown in FIGS. 1 and 2. In DVB-T there are two modes of operation, a 2K mode—corresponding to the use of 2048 subcarriers—and an 8K mode—corresponding to the use of 8192 subcarriers. In this example, it is assumed that the receiver is operating in the 8K mode. Operation in the 2K mode is similar and not described herein. The channel estimation arrangement of FIG. 1 comprises Fast Fourier Transform (FFT) element 105, carrier phase error (CPE) removal element 110 and channel estimation and equalization (CHE) element 115. FFT element 105 processes a received baseband signal 104. The latter is provided by, e.g., a tuner (not shown) tuned to a selected RF channel. FFT element 105 transforms received baseband signal 104 from the time domain to the frequency domain and provides an FFT output signal 106. It should be noted that FFT output signal 106 represents complex signals having in-phase and quadrature components. Typically, FFT element 105 performs butterfly calculations as known in the art and provides reordered output data (8192 complex samples in an 8 k mode of operation). As such, FFT element 105 may additionally perform spectrum shifting to rearrange, or shift, the FFT output data to comply with subcarrier locations in accordance with the above-mentioned DVB-T standard. CPE removal element 110 processes FFT output signal 106 to remove any carrier phase error and provides a CPE corrected signal 111 to CHE element 115. CHE element 115 processes the CPE corrected signal 111 for (a) determining channel state information (CSI) for providing CSI signal 117; and (b) equalizing the received baseband signal to compensate for any transmission channel distortion for providing equalized signal 116. As known in the art, CSI signal 117 may be used for obtaining bit metrics for use in decoding (not shown in FIG. 1). Equalized signal 116 is further processed by the receiver to, e.g., recover content conveyed therein (audio, video, etc.) (also not shown in FIG. 1).

Turning now to FIG. 2, the operation of CHE element 115 is shown in more detail. CHE element 115 comprises pre-process element 150, time interpolator 155, frequency interpolator 160, data buffer 165 and equalizer 170. Data buffer 165 simply delays CPE corrected signal 111 before processing by equalizer 170 while the CSI information is determined by the elements in the lower processing path (pre-process element 150, time interpolator 155 and frequency interpolator 160). As noted above, equalizer 170 equalizes the received baseband signal (e.g., the delayed version of CPE corrected signal 111) to compensate for any transmission channel distortion for providing equalized signal 116.

In terms of the lower processing path, the channel estimation process utilizes the pilot signals present in DVB-T. In particular, in DVB-T there are two types of pilots: scattered pilots (SP) and continual pilots (CP), and the channel estimation process uses interpolation to estimate the channel state information (CSI) of the subcarriers from the SPs. First, pre-process element 150 processes CPE corrected signal 111 to determine the CSI of the received SPs. Since the pilots are transmitted with known values, pre-process element 150 processes the received SPs relative to their known values to determine their channel state information, which is provided via pre-process output signal 151. The CSI of the SPs (151) are then processed by time interpolator 155. In particular; time interpolator 155 interpolates (in the time domain) the CSI of every third subcarrier and provides output signal 156 (which includes the CSI of the SPs and the newly time interpolated CSI of every third subcarrier). Finally, frequency interpolator 160 processes output signal 156. In particular, frequency interpolator 160 interpolates (in the frequency domain) the CSI of all of the subcarriers (in effect smoothing the previously determined CSI of, e.g., the SPs) and provides CSI signal 117 (which provides the CSI for all subcarriers). Equalizer 170 utilizes CSI signal 117 to perform the above-described equalization of the received baseband signal and, as also noted above, CSI signal 117 may be used for obtaining bit metrics for use in decoding.

SUMMARY OF THE INVENTION

We have realized that it is possible to further improve the operation and efficiency of determining channel state information in a multi-carrier transmission system. In particular, and in accordance with the principles of the invention, a receiver determines a multi-path delay of a received signal; and adjusts the bandwidth of a frequency interpolator as a function of the determined multi-path delay, wherein the frequency interpolator interpolates channel state information for all subcarriers of the received signal.

In an illustrative embodiment of the invention, a receiver is an OFDM-based receiver, e.g., a DVB-T/H receiver. The DVB-T/H receiver comprises a controller and a frequency interpolator for use in estimating CSI information of a received signal by frequency interpolation. The controller determines a maximum multi-path delay ($T_{max}$) for the received signal and adjusts the bandwidth of the frequency interpolator as a function of the determined multi-path delay. For example, when the multi-path delay is small, the bandwidth of the frequency interpolator is adjusted to be smaller than the bandwidth of the frequency interpolator when the multi-path delay is large. In addition, the controller may also change the coefficients of the frequency interpolator such that different word lengths are used for the coefficients as a function of the determined multi-path delay. This adjustment of word length further improves resource utilization in the receiver.

In view of the above, and as will be apparent from reading the detailed description, other embodiments and features are also possible and fall within the principles of the invention.

DETAILED DESCRIPTION

Other than the inventive concept, the elements shown in the figures are well known and will not be described in detail. For example, other than the inventive concept, familiarity with Discrete Multitone (DMT) transmission (also referred to as Orthogonal Frequency Division Multiplexing (OFDM) or Coded Orthogonal Frequency Division Multiplexing (COFDM)) is assumed and not described herein. Also, familiarity with television broadcasting, receivers and video encoding is assumed and is not described in detail herein. For example, other than the inventive concept, familiarity with current and proposed recommendations for TV standards such as NTSC (National Television Systems Committee), PAL (Phase Alternation Lines), SECAM (SEquential Couleur Avec Memoire), ATSC (Advanced Television Systems Committee) (ATSC), Digital Video Broadcasting (DVB) and the Chinese Digital Television System (GB) 20600-2006 (Digital Multimedia Broadcasting-Terrestrial/Handheld (DMB-T/H)) is assumed. Further information on DVB-T/H can be found in, e.g., ETSI EN 300 744 V1.4.1 (2001-01), *Digital Video Broadcasting (DVB); Framing structure, channel coding and modulation for digital terrestrial television*; and ETSI EN 302 304 V1.1.1 (2004-11), *Digital Video Broadcasting (DVB); Transmission System for Handheld Terminals (DVB-H)*. Likewise, other than the inventive concept, other transmission concepts such as eight-level vestigial sideband (8-VSB), Quadrature Amplitude Modulation (QAM), and receiver components such as a radio-frequency (RF) front-end, or receiver section, such as a low noise block, tuners, and down converters; along with fast fourier transform (FFT) elements, spectrum shifters, channel state information (CSI) estimators, time interpolators, frequency interpolators, equalizers, demodulators, correlators, leak integrators and squarers is assumed. Further, other than the inventive concept, familiarity with processing signals, such as forming channel state information, is assumed and not described herein. Similarly, other than the inventive concept, formatting and encoding methods (such as Moving Picture Expert Group (MPEG)-2 Systems Standard (ISO/IEC 13818-1)) for generating transport bit streams are well-known and not described herein. It should also be noted that the inventive concept may be implemented using conventional programming techniques (such as represented by matlab), which, as such, will not be described herein. In this regard, the embodiments described herein may be implemented in the analog or digital domains. Further, those skilled in the art would recognize that some of the processing may involve complex signal paths as necessary. Finally, like-numbers on the figures represent similar elements.

Figure 3:
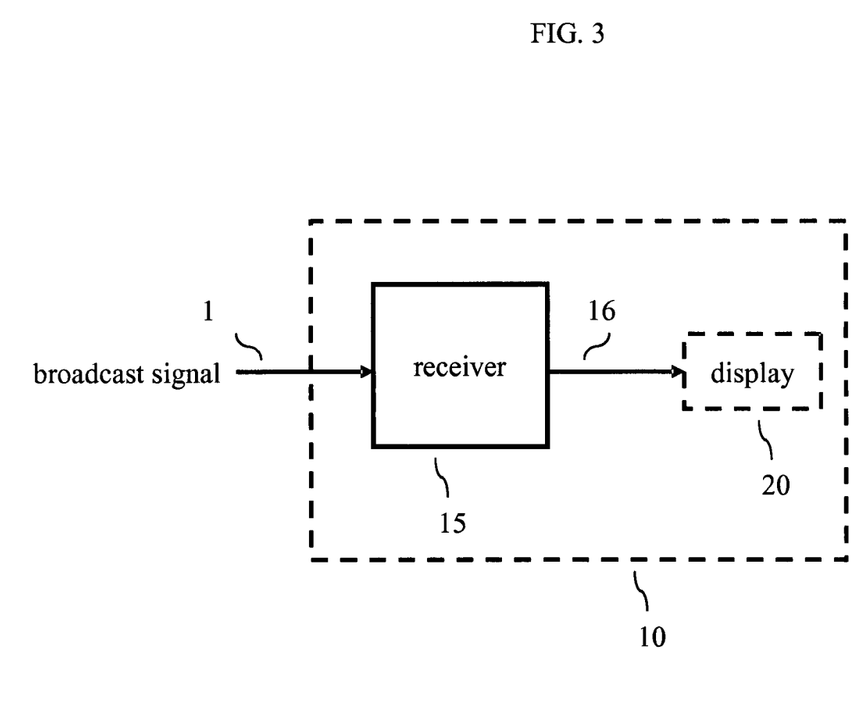
FIG. 3 shows an illustrative embodiment of an apparatus in accordance with the principles of the invention.

Referring now to FIG. 3, an illustrative embodiment of a device 10 in accordance with the principles of the invention is shown. Device 10 is representative of any processor-based platform, e.g., a PC, a server, a set-top box, a personal digital assistant (PDA), a cellular telephone, a mobile digital television (DTV), a DTV, etc. In this regard, device 10 includes one, or more, processors with associated memory (not shown) and also comprises receiver 15. The latter receives a broadcast signal 1 via an antenna (not shown)) and provides output signal 16 for application to an output device 20, which may, or may not, be a part of device 10 as represented in dashed-line form. In the context of this example, output device 20 is a display that allows a user to view a selected TV program. For the purposes of this example, it is assumed that broadcast signal 1 is representative of a DVB-T/H service, i.e., a DTV transport stream, which includes video, audio and/or system information for at least one TV channel and that broadcast signal 1 conveys this information using at least a multi-carrier modulation such as orthogonal frequency division multiplexing (OFDM). However, the inventive concept is not so limited and is applicable to any receiver that performs frequency interpolation. In accordance with the principles of the invention, receiver 15 determines a multi-path delay ($T_{max}$) of a received signal; and adjusts a bandwidth of a frequency interpolator as a function of the determined multi-path delay, wherein the frequency interpolator interpolates channel state information for subcarriers of the received signal.

Figure 4:
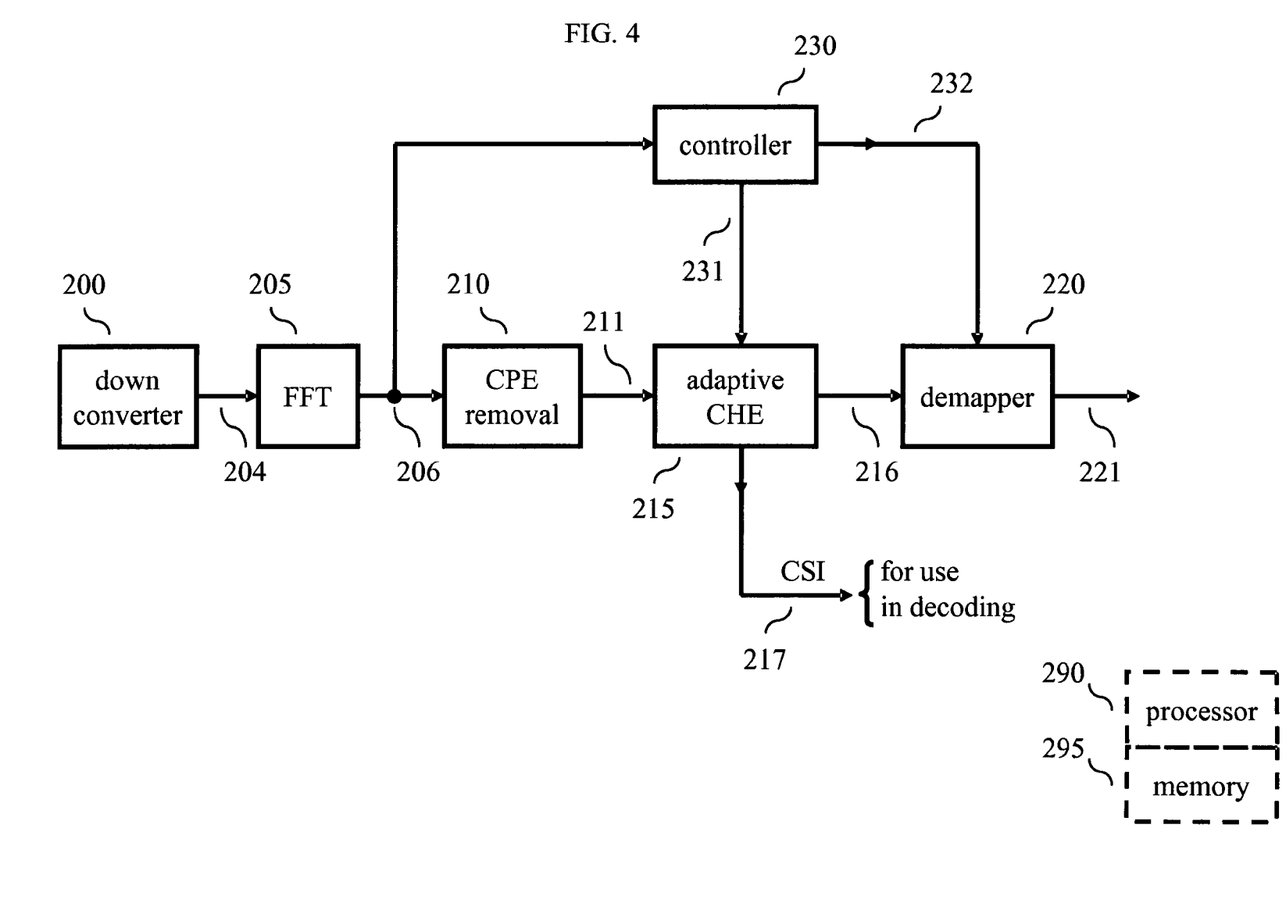
FIG. 4 shows an illustrative embodiment of a portion of a receiver in accordance with the principles of the invention.

Turning now to FIG. 4, an illustrative portion of receiver 15 is shown. Only that portion of receiver 15 relevant to the inventive concept is shown. Other than the inventive concept, the elements shown in FIG. 4 are known and not described herein. In this example, it is assumed that receiver 15 is operating in the 2K mode. It should be noted that operation in the 8K mode is similar and, as such, not described herein. Receiver 15 comprises downconverter 200, fast fourier transform (FFT) element 205, carrier phase error (CPE) removal element 210, adaptive channel estimation and equalizer (CHE) 220, demapper 220 and controller 230. In addition, receiver 15 is a processor-based system and includes one, or more, processors and associated memory as represented by processor 290 and memory 295 shown in the form of dashed boxes in FIG. 4, e.g., controller 230 may be implemented as a microprocessor. In this context, computer programs, or software, are stored in memory 295 for execution by processor 290. The latter is representative of one, or more, stored-program control processors and these do not have to be dedicated to the receiver function, e.g., processor 290 may also control other functions of receiver 15. For example, if receiver 15 is a part of a larger device, processor 290 may control other functions of this device. Memory 295 is representative of any storage device, e.g., random-access memory (RAM), read-only memory (ROM), etc.; may be internal and/or external to receiver 15; and is volatile and/or non-volatile as necessary.

FFT element 205 processes a received baseband signal 204. The latter is provided by downconverter 200, which is a part of a tuner (not shown) of receiver 15 tuned to a selected RF channel associated with broadcast signal 1 of FIG. 3. FFT element 205 transforms received baseband signal 204 from the time domain to the frequency domain and provides FFT output signal 206. It should be noted that FFT output signal 206 represents complex signals having in-phase and quadrature components. Typically, FFT element 105 performs butterfly calculations as known in the art and provides reordered output data (2048 complex samples in a 2 k mode of operation). As such, FFT element 205 may additionally perform spectrum shifting to rearrange, or shift, the FFT output data to comply with subcarrier locations in accordance with the above-mentioned DVB-T standard. CPE removal element 210 processes FFT output signal 206 to remove any carrier phase error and provides a CPE corrected signal 211 to CHE element 215. In accordance with the principles of the invention (described further below), CHE element 215 processes the CPE corrected signal 211 for (a) determining channel state information (CSI) for providing CSI signal 217; and (b) equalizing the received baseband signal to compensate for any transmission channel distortion for providing equalized signal 216. As known in the art, CSI signal 217 may be used for obtaining bit metrics for use in decoding (not shown in FIG. 4). Equalized signal 216 is applied to demapper 220. The latter processes equalized signal 216 for making hard decisions (i.e., hard decoding) as to the possibly transmitted symbols and provides a symbol stream 221, which is further processed by the receiver (e.g., soft decoding, not shown) to, e.g., recover content conveyed therein (audio, video, etc.). Finally, controller 230 processes FFT output signal 206 to determine an associated multi-path delay, $T_{max}$. In this example, controller 230 transforms FFT output signal 206 back into the time domain for determining the multi-path delay, $T_{max}$. Other than the inventive concept, the calculation of a multi-path delay in the time domain is known and not described herein. For example, controller 230 determines the length of the echo in the received signal as representative of the multi-path delay, $T_{max}$. Once the multi-path delay, $T_{max}$, is determined, and in accordance with the principles of the invention, controller 230 alters a bandwidth of a frequency interpolator of adaptive CHE 215, via signal 231. In accordance with a feature of the invention, described further below, controller 230 may also change a dividing factor for use by demapper 220, via signal 232.

Figure 5:
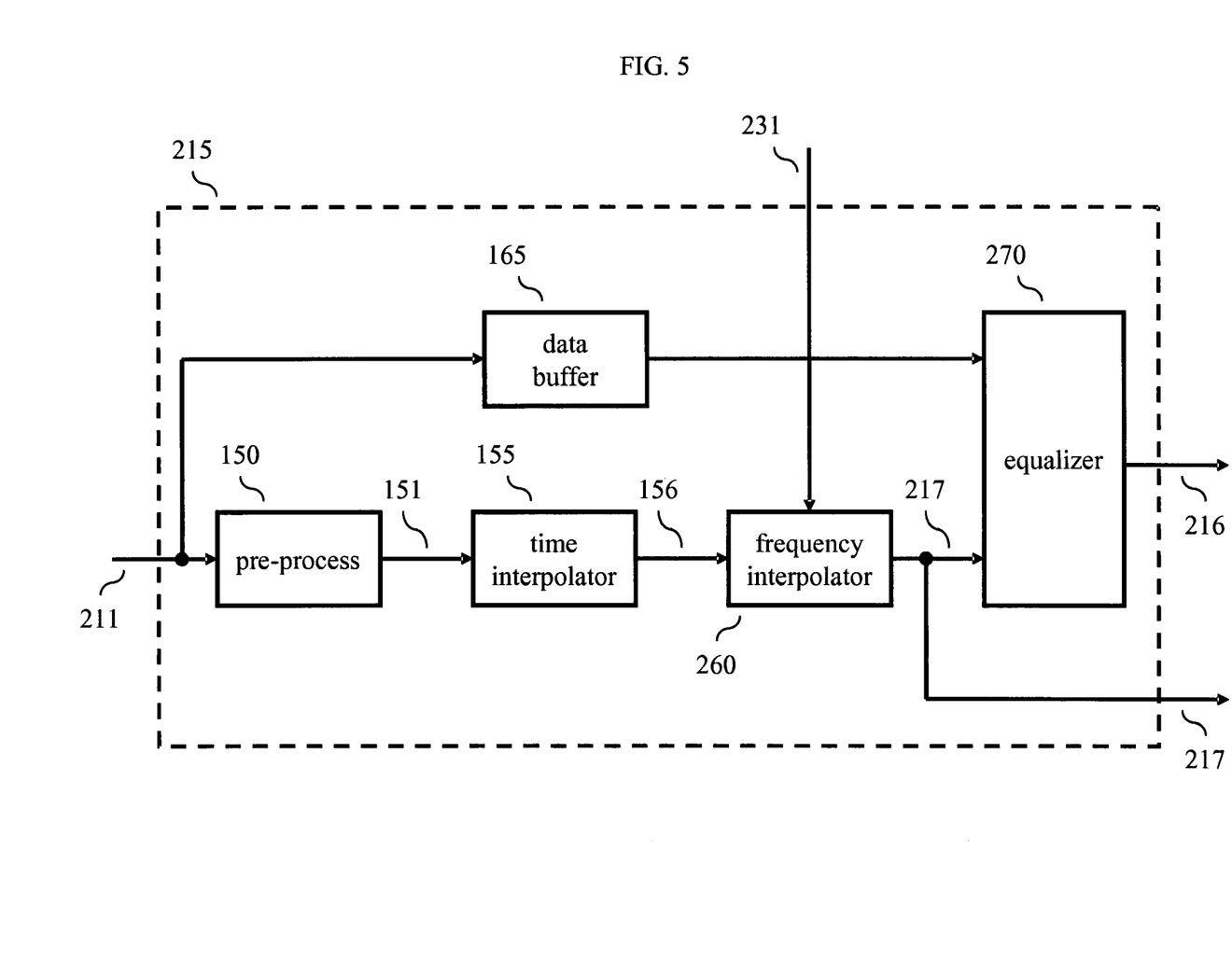
FIG. 5 shows an illustrative embodiment of channel estimation and equalization element 215 in accordance with the principles of the invention.

Attention should now be directed to FIG. 5, which shows an illustrative embodiment of adaptive CHE 215 in accordance with the principles of the invention. Other than the inventive concept, the elements shown in FIG. 5 are known and not described herein. CHE element 215 comprises: pre-process element 150, time interpolator 155, frequency interpolator 260, data buffer 165 and equalizer 270. Data buffer 165 simply delays CPE corrected signal 211 before processing by equalizer 270 while the CSI information is determined by the elements in the lower processing path (pre-process element 150, time interpolator 155 and frequency interpolator 260). As noted above, equalizer 270 equalizes the received baseband signal (e.g., the delayed version of CPE corrected signal 211) to compensate for any transmission channel distortion for providing equalized signal 216.

In terms of the lower processing path, and other than the inventive concept, the channel estimation process utilizes the pilot signals present in DVB-T as described earlier. In particular, pre-process element 150 processes CPE corrected signal 211 to determine the CSI of the received SPs. Since the pilots are transmitted with known values, pre-process element 150 processes the received SPs relative to their known values to determine their channel state information, which is provided via pre-process output signal 151. The CSI of the SPs (151) are then processed by time interpolator 155. In particular, time interpolator 155 interpolates (in time) the CSI of every third subcarrier and provides output signal 156 (which includes the CSI of the SPs and the newly time interpolated CSI of every third subcarrier). Finally, frequency interpolator 260 processes output signal 156. In particular, frequency interpolator 260 interpolates (in frequency) the CSI of all of the subcarriers (in effect smoothing the previously determined CSI of, e.g., the SPs) and provides CSI signal 217 (which provides all of the CSI for all subcarriers). Equalizer 270 utilizes CSI signal 217 to perform the above-described equalization of the received baseband signal and, as also noted above, CSI signal 217 may be used for obtaining bit metrics for use in decoding.

In accordance with the principles of the invention, CHE 215 is adapted to different multi-path delays. Illustratively, the bandwidth of frequency interpolator 260 changes as a function of the multi-path delay. For example, frequency interpolator 260 comprises a number of filter coefficients (not shown) for filtering the input signal. The values, or ranges, of these filter coefficients are set by controller 230 (via signal 231) as a function of the desired bandwidth of frequency interpolator 260. In particular, when a value for $T_{max}$ is small, the bandwidth should be small to ensure effective noise filtering. Thus, the main-lobe of the impulse response of the filter (of frequency interpolator 260) is low and the filter coefficients have a small range. However, when a value for $T_{max}$ is large, the bandwidth should be set a large value. Thus, the main-lobe of the impulse response of the filter (of frequency interpolator 260) is high and the filter coefficients have a large range. Illustratively, controller 230 selects a set of filter coefficient values from a number of stored coefficient sets (e.g., stored in a memory of controller 230), where each coefficient set is associated with a particular bandwidth setting of frequency interpolator 260. In this example, controller 230 simply has two coefficient sets, one for increasing the bandwidth of frequency interpolator 260 and the other for decreasing the bandwidth of frequency interpolator 260.

In accordance with a feature of the invention, it should also be noted that since coefficient sets have different ranges receiver resources can be more efficiently managed. For example, if a coefficient set has a larger range, then a longer word-length must be used for the filter coefficients with regard to, e.g., the fixed-length processing. However, if a coefficient set has a smaller range, then a shorter word-length can now be used for the filter coefficients with regard to, e.g., the fixed-length processing for obtaining the same accuracy. The ability to use shorter word lengths requires less resources in the receiver. Illustratively, controller 230 can adjust the word length used in the fixed-length processing by administering an associated parameter that sets the word length in the fixed-length processor (e.g., a digital signal processor of receiver 15).

However, even though the fixed length processing could by dynamically adjusted by controller 215, in accordance with another feature of the invention, a different approach can be used for setting the word length. In particular, controller 230 can adjust the word length to a lower, or lowest, value for use in all of the fixed-length processing. As a result, receiver resources are managed more efficiently although at reduced accuracy for those bandwidth settings of frequency interpolator 260 requiring a larger word length.

Figure 6:
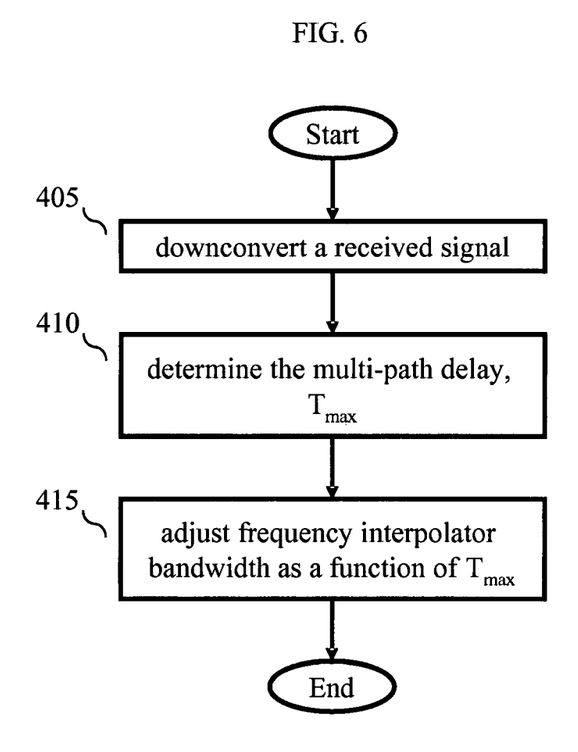
FIGS. 6 and 7 show illustrative flow charts for use in a receiver in accordance with the principles of the invention.
Figure 7:
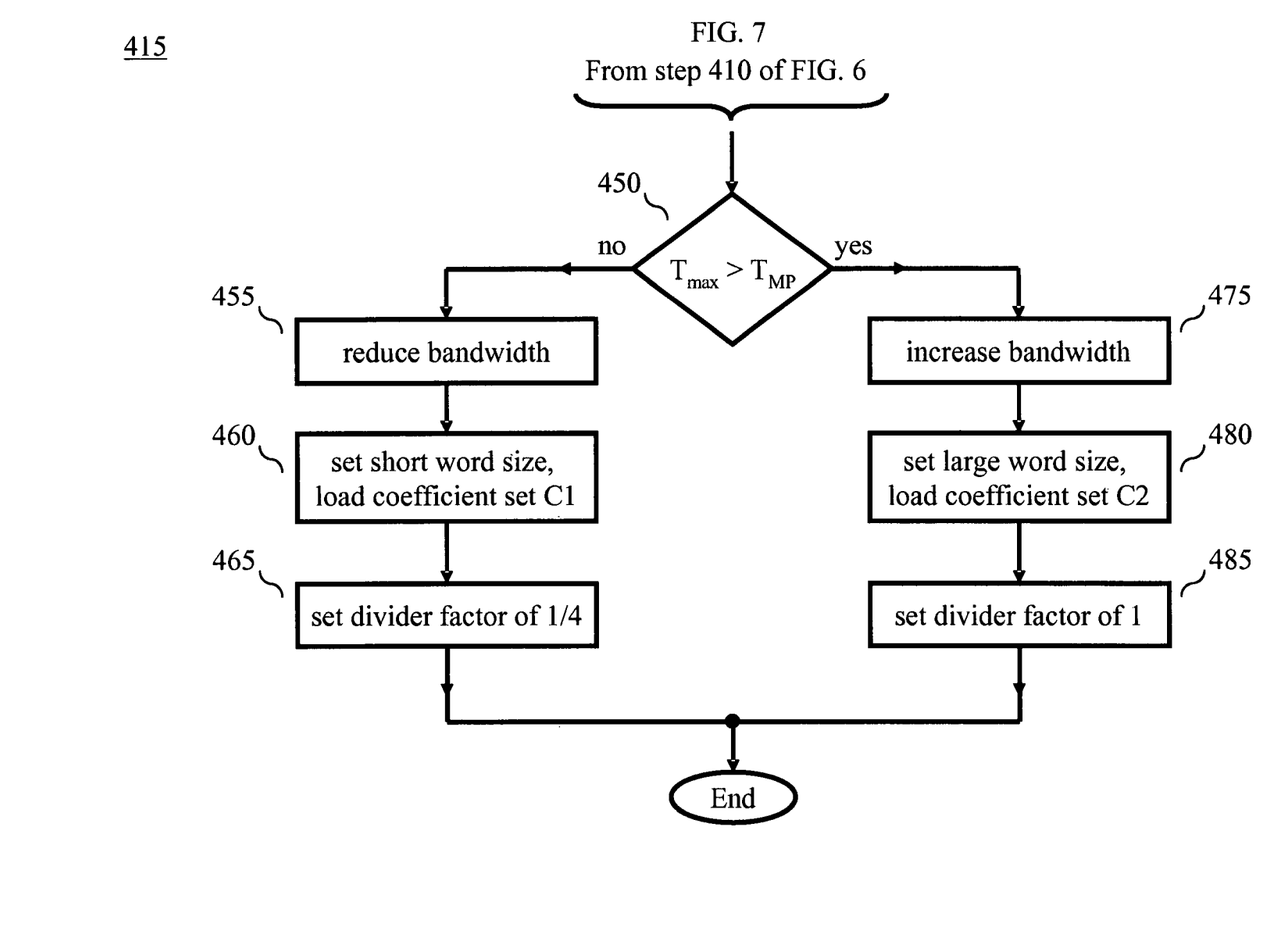

Turning now to FIGS. 6 and 7, illustrative flow charts for use in a receiver for determining channel state information in accordance with the principles of the invention are shown. In step 405, a receiver downconverts a received broadcast signal (e.g., receiver 15 of FIG. 3). In step 410, the receiver determines a multi-path delay, $T_{max}$, associated with the received signal (e.g., controller 230 of FIG. 4). Finally, and in accordance with the principles of the invention, the receiver adjusts the bandwidth of the frequency interpolator as a function of the determined multi-path delay in step 415.

An example of step 415 of FIG. 6 is shown in the flow chart of FIG. 7. It is assumed that a number of sets of filter coefficients corresponding to various values, or ranges, of $T_{max}$ are stored in controller 230 of FIG. 4. For example, assume that controller 230 stores two coefficient sets, C1 and C2. Set C1 is associated with a reduced bandwidth and a shorter word length; while set C2 is associated with an increased bandwidth and a longer word length. Illustratively, it is assumed that frequency interpolator 260 comprises twelve taps, i.e., each coefficient set comprises values for twelve filter coefficients, e.g., $C1=\{c_1^1, \ldots, c_{12}^1\}$; and $C2=\{c_1^2, \ldots, c_{12}^{21}\}$, where the superscript identifies the particular coefficient set for each individual filter coefficient and the subscript identifies the particular value for the filter coefficient of the set. Thus, different fixed-point processing can be used for different-sized word lengths of the filter coefficients. For example, for a shorter word length, data in the frequency domain is represented by 12 bits (binary digits). In this example, the coefficients of set C1 each have a word length of 12 bits. However, for a larger word length, data in the frequency domain is represented by, e.g., 14 bits. In this example, the coefficients of set C2 each have a word length of 14 bits. As a result, when the multi-path delay is low, processing the smaller-sized filter coefficients is just as effective as processing the larger-sized filter coefficients—yet by processing the smaller-sized filter coefficients, the receiver operates more efficiently.

Continuing now with the flow chart of FIG. 7, in step 450, the receiver compares the determined multi-path delay, $T_{max}$, to a predetermined value, $T_{MP}$ (e.g., a value of 100 μsec. (micro-seconds)). The value for $T_{MP}$ can be determined experimentally. If the value of $T_{max}$ is greater than the value of $T_{MP}$, then the receiver increases the bandwidth of frequency interpolator 260 of CHE 215 in step 475 by selecting coefficient set C2. In step 480, the receiver sets the word size to large and loads coefficient set C2 into frequency interpolator 260. Then, in step 485, the receiver sets the divider factor to 1 (signal 232 of FIG. 4) for use in demapper 220. On the other hand, if the value of $T_{max}$ is not greater than the value of $T_{MP}$, then the receiver decreases the bandwidth of frequency interpolator 260 of CHE 215 in step 455 by selecting coefficient set C1, sets the word size to short and loads coefficient set C1 into frequency interpolator 260 in step 460, and sets the divider factor to ¼ (signal 232 of FIG. 4) for use in demapper 220 in step 465. It should be noted that the divider factor is related to the difference in word lengths, y; where the divider factor is:

$$\frac{1}{2^y}.$$

For example, here the difference is word lengths is 2 bits, and the divider factor for the lower setting is $$\frac{1}{2^2} = \frac{1}{4}.$$

As described above, and in accordance with the principles of the invention, a receiver alters the bandwidth of a frequency interpolator as a function of the multi-path delay for determining channel state information. Advantageously, this approach may also require less resources than conventional channel estimation techniques. For example, the word size for the associated tap coefficients can be altered as a function of the multi-path delay. It should also be noted that although the inventive concept was described in the context of two coefficient sets, the inventive concept is not so limited and more than two coefficient sets can be used as can different ranges for values of $T_{max}$. Further, the coefficient sets may have the same or different word lengths. In addition, it should be noted that although the inventive concept was illustrated in the context of a DTV-T broadcast signal, the inventive concept is not so limited and is applicable to other types of receivers that may determine channel state information, such as a software defined radio receiver, a DMB-T/H receiver, etc.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied in one, or more, integrated circuits (ICs). Similarly, although shown as separate elements, any or all of the elements may be implemented in a stored-program-controlled processor, e.g., a digital signal processor, which executes associated software, e.g., corresponding to one, or more, of the steps shown in, e.g., FIGS. 6-7, etc. Further, the principles of the invention are applicable to other types of communications systems, e.g., satellite, Wireless-Fidelity (Wi-Fi), cellular, etc. Indeed, the inventive concept is also applicable to stationary or mobile receivers. It is therefore to be understood that numerous modifications may be made to the illustrative embodiments and that other arrangements may be devised without departing from the spirit and scope of the present invention as defined by the appended claims.

The invention claimed is:

1. A method for use in an apparatus, the method comprising:
   determining a multi-path delay of a received signal;
   adjusting a bandwidth of a frequency interpolator as a function of the determined multi-path delay, wherein the frequency interpolator interpolates channel state information for subcarriers of the received signal, and wherein the adjusting step includes setting filter coefficient values of the frequency interpolator as a function of the determined multi-path delay, including changing a word length of at least some of the filter coefficient values as a function of the determined multi-path delay, wherein the word length of the at least some of the filter coefficient values increases as a function of the determined multi-path delay; and
   setting a dividing factor of a demapper as a function of the determined multi-path delay, wherein the demapper provides a received symbol stream recovered from the received signal.

2. The method of claim 1, further comprising the step of: storing filter coefficient sets.

3. The method of claim 2, wherein the adjusting step further comprises:
   selecting one of the stored filter coefficients sets for use by the frequency interpolator as a function of the determined multi-path delay.

4. The method of claim 2, wherein at least one of the stored filter coefficients sets has filter coefficients represented by a different word length than the other stored filter coefficient sets.

5. The method of claim 1, further comprising the steps of:
   downconverting a received radio frequency signal for providing a downconverted signal; and performing a fast fourier transform (FFT) on the downconverted signal for providing the received signal.

6. Apparatus comprising:
a frequency interpolator for providing channel state information for subcarriers of a received signal;
a processor for (a) determining a multi-path delay of the received signal; and (b) adjusting a bandwidth of the frequency interpolator as a function of the determined multi-path delay, wherein the processor sets filter coefficient values of the frequency interpolator as a function of the determined multi-path delay, including changing a word length of at least some of the filter coefficient values as a function of the determined multi-path delay, wherein the word length of the at least some of the filter coefficient values increases as a function of the determined multi-path delay; and
a demapper for providing a received symbol stream recovered from the received signal, wherein the processor sets a dividing factor of the demapper as a function of the determined multi-path delay.

7. The apparatus of claim 6 further comprising:
a memory for storing filter coefficient sets;
wherein the processor selects one of the stored filter coefficients sets for use by the frequency interpolator as a function of the determined multi-path delay.

8. The apparatus of claim 7, wherein at least one of the stored filter coefficients sets has filter coefficients represented by a different word length than the other stored filter coefficient sets.

9. The apparatus of claim 6, further comprising:
a downconverter for downconverting a received radio frequency signal for providing a downconverted signal; and
a fast fourier transform (FFT) element for processing the downconverted signal to provide the received signal.

10. The method of claim 1, wherein the demapper is a hard demapper.

11. The apparatus of claim 6, wherein the demapper is a hard demapper.

* * * * *